United States Patent
Harada et al.

(10) Patent No.: US 7,416,797 B2
(45) Date of Patent: Aug. 26, 2008

(54) MONITOR DEVICE FOR FUEL CELL

(75) Inventors: Ichiro Harada, Tochigi-ken (JP);
Toshiya Wakahoi, Utsunomiya (JP);
Jun Kondo, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 758 days.

(21) Appl. No.: 11/025,383

(22) Filed: Dec. 29, 2004

(65) Prior Publication Data

US 2005/0153174 A1 Jul. 14, 2005

(30) Foreign Application Priority Data

Jan. 14, 2004 (JP) ............................. 2004-006375

(51) Int. Cl.
*H01M 8/02* (2006.01)

(52) U.S. Cl. ............................. 429/12; 429/22; 429/34

(58) Field of Classification Search .................. 429/12, 429/22, 34
See application file for complete search history.

(56) References Cited

U.S. PATENT DOCUMENTS 6,522,955 B1 * 2/2003 Colborn ...................... 700/286

FOREIGN PATENT DOCUMENTS

| JP | 11-339828   | 12/1999 |
|----|-------------|---------|
| JP | 2002-352820 | 12/2002 |

* cited by examiner

*Primary Examiner*—Gregg Cantelmo
(74) *Attorney, Agent, or Firm*—Fish & Richardson P.C.

(57) ABSTRACT

A seal space is formed between first and second metal separators of a power generation cell. A device body is disposed in the seal space. The device body includes a voltage measurement sensor and a transmission mechanism. The voltage measurement sensor measures the voltage generated during operation of the power generation cell. The transmission mechanism transmits information of the voltage measured by the voltage measurement sensor via wireless communication. The voltage measurement sensor and the transmission mechanism are embedded in an electromagnetic/heat resistant shield member, and attached to a surface of the second metal separator.

7 Claims, 5 Drawing Sheets

MONITOR DEVICE FOR FUEL CELL

BACKGROUND OF THE INVENTION

1. Field of the Invention

The present invention relates to a monitor device for monitoring operating condition of a fuel cell including an electrolyte electrode assembly and separators sandwiching the electrolyte electrode assembly. The electrolyte electrode assembly includes a pair of electrodes and an electrolyte interposed between the electrodes.

2. Description of the Related Art

For example, a solid polymer fuel cell employs a polymer ion exchange membrane as a solid polymer electrolyte membrane. The solid polymer electrolyte membrane is interposed between an anode and a cathode to form a membrane electrode assembly. Each of the anode and the cathode is made of electrode catalyst and porous carbon. The membrane electrode assembly is sandwiched between separators (bipolar plates) to form the fuel cell.

In the fuel cell, a fuel gas such as a gas chiefly containing hydrogen (hereinafter also referred to as the hydrogen-containing gas) is supplied to the anode. The air or the like (hereinafter also referred to as the oxygen-containing gas) is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

In this type of the fuel cell, generally, the cell voltage of the fuel cell is detected using a voltage detection device for detecting the operating condition of the fuel cell, e.g., in an attempt to determine whether the desired power generation performance is achieved or not. For example, Japanese Laid-Open Patent Publication No. 11-339828 discloses a fuel cell stack having a cell voltage measurement terminal.

According to the disclosure of Japanese Laid-Open Patent Publication No. 11-339828, as shown in FIG. 5, electrode units 1 and separators 2 are stacked together to form a fuel cell stack 3. Each of the electrode units 1 includes a hydrogen electrode 4a, an air electrode 4b, and a polymer ion exchange membrane 5 interposed between the hydrogen electrode 4a and the air electrode 4b. A hydrogen flow field 6a is formed between one of the separators 2 and the hydrogen electrode 4a, and an air flow field 6b is formed between the other of the separators 2 and the air electrode 4b. Further, a cooling water flow field 6c is formed between the adjacent separators 2.

A voltage measurement terminal 7 protrudes outwardly from an end of the separator 2. A socket (not shown) is connected to the voltage measurement terminal 7. Thus, the cell voltage in each electrode unit 1 is measured during operation of the fuel cell stack 3.

However, in Japanese Laid-Open Patent Publication No. 11-339828, since the voltage measurement terminal 7 protrudes outwardly from the end of the separator 2, it is difficult to maintain the desired sealing performance in the exposed metal portion. Therefore, foreign material may enter the fuel cell stack 3 from a position near the voltage measurement terminal 7 undesirably.

Further, since the voltage measurement terminal 7 is connected to the socket, the contact resistance is generated to cause the voltage drop. Thus, it is not possible to accurately measure the cell voltage.

Further, in the fuel cell stack 3, typically, it is necessary to detect various operating conditions such as the internal humidity, the internal pressure, or the internal temperature in addition to the cell voltage. In any cases, the same problem as with the voltage detection device occurs.

SUMMARY OF THE INVENTION

A main object of the present invention is to provide a monitor device for a fuel cell which makes it possible to detect operating condition of the fuel cell accurately, and maintain the desired sealing performance.

The present invention relates to a monitor device for monitoring operating condition of a fuel cell. The fuel cell includes an electrolyte electrode assembly and separators sandwiching the electrolyte electrode assembly. The electrolyte electrode assembly includes a pair of electrodes and an electrolyte interposed between the electrodes. The monitor device comprises an internal information detection mechanism for detecting internal information of the fuel cell, a transmission mechanism for transmitting the detected internal information via wireless communication, and a receiver mechanism provided outside the fuel cell for receiving the internal information transmitted via wireless communication. The internal information detection mechanism and the transmission mechanism are provided inside seal members of the separators.

It is preferable that a seal space surrounded by the seal members is formed between the separators such that entry of foreign material into the seal space is prevented, and at least one of the internal information detection mechanism and the transmission mechanism is disposed in the seal space.

Further, it is preferable that the internal information detection mechanism includes a voltage measurement sensor for measuring the cell voltage of the fuel cell.

According to the present invention, the internal information detection mechanism and the transmission mechanism are provided between the separators, and the receiver mechanism is provided outside the fuel cell. Wireless communication for sending information from the transmission mechanism to the receiver mechanism is performed. Therefore, no components such as terminals or lead wires protruding toward the outside are required. Thus, the sealing structure is very simple. A non-contact monitoring scheme is adopted for accurately detecting operating conditions such as the cell voltage, the internal pressure, the internal humidity, or the internal temperature in real time. Further, since the internal detection mechanism is provided in the fuel cell, the voltage drop due to the contact resistance or the like is prevented, and it is possible to measure the cell voltage accurately.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
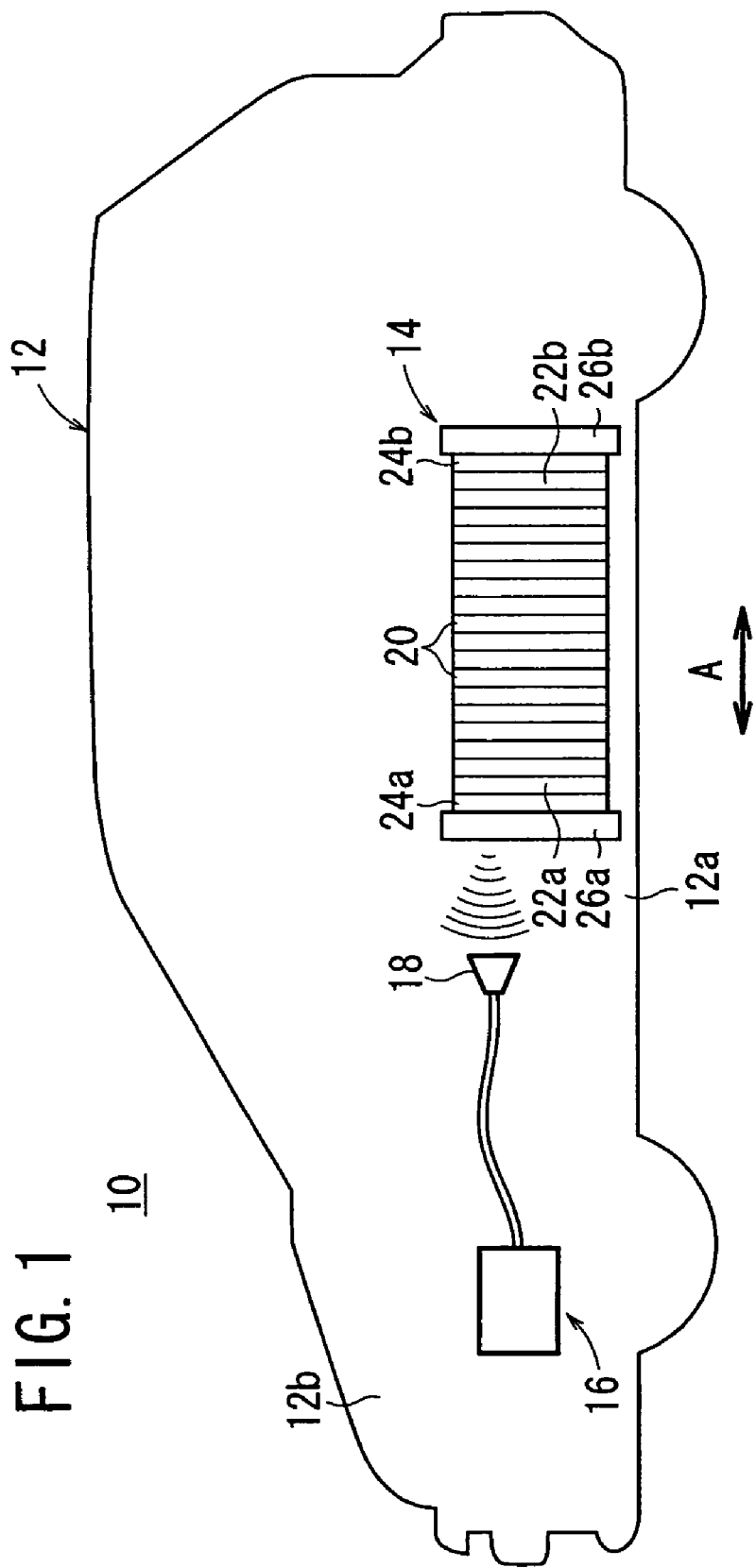
FIG. 1 is a view schematically showing a condition in which a monitor device for a fuel cell according to the present invention is mounted in a vehicle.

FIG. 1 is a view schematically showing a condition in which a monitor device 10 for a fuel cell according to the present invention is mounted in a vehicle 12. A fuel cell stack 14 is placed on a floor 12a of the vehicle 12. A controller 16 of the monitor device 10 is disposed in a front portion (under the hood) 12b of the vehicle 12. A receiver antenna (receiver mechanism) 18 is provided adjacent to the fuel cell stack 14.

The fuel cell stack 14 is formed by stacking a plurality of power generation cells (fuel cells) 20 in a direction indicated by an arrow A (longitudinal direction of the vehicle). Terminal plates 22a, 22b are provided at opposite ends of the power generation cells 20 in the stacking direction. Insulating plates 24a, 24b are provided outside the terminal plates 22a, 22b. Further, end plates 26a, 26b are provided outside the insulating plates 24a, 24b. The end plates 26a, 26b are tightened together by unillustrated tie rods or the like. In this manner, the components are assembled into the fuel cell stack 14.

Figure 2:
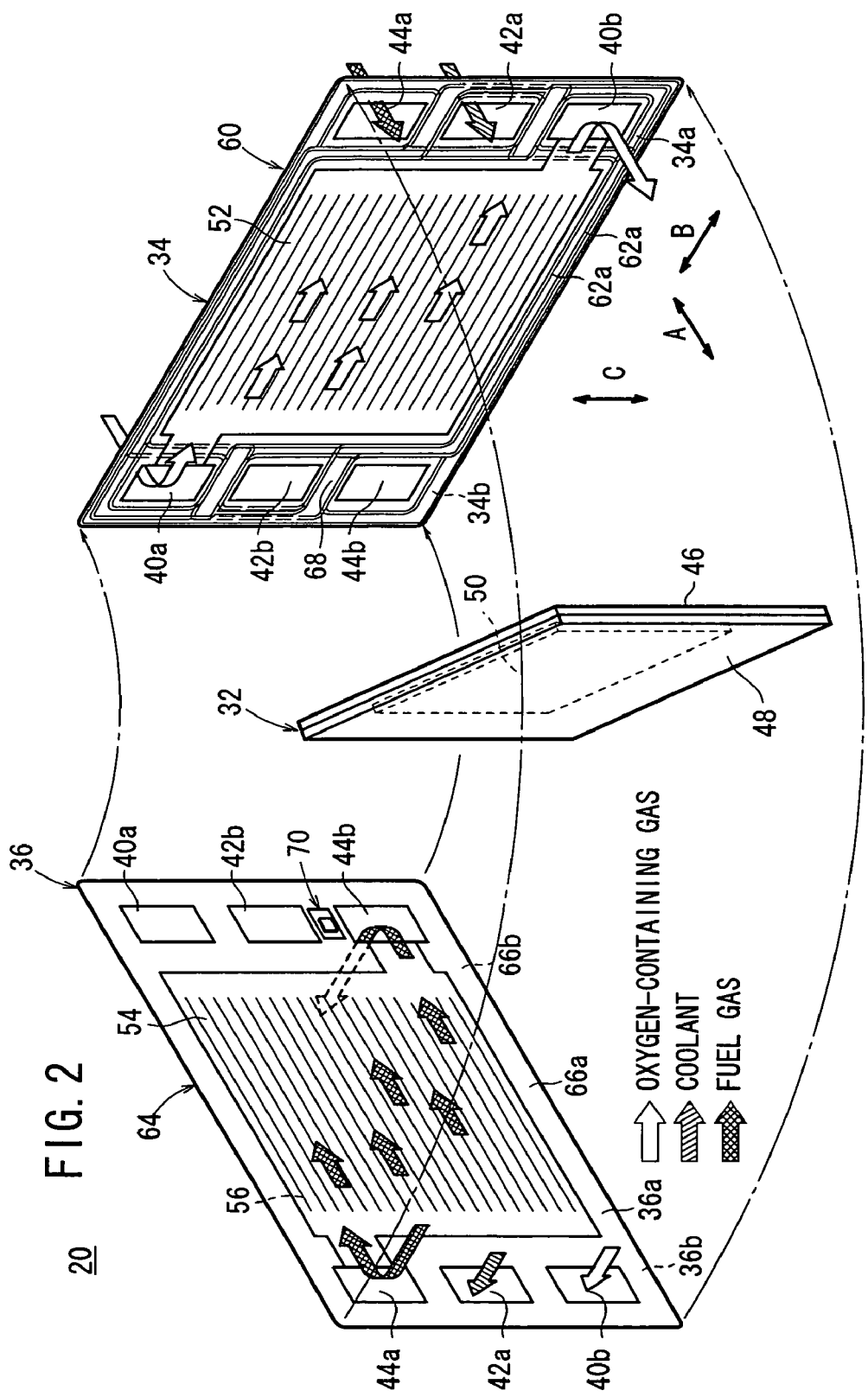
FIG. 2 is an exploded perspective view showing main components of a power generation cell.
Figure 3:
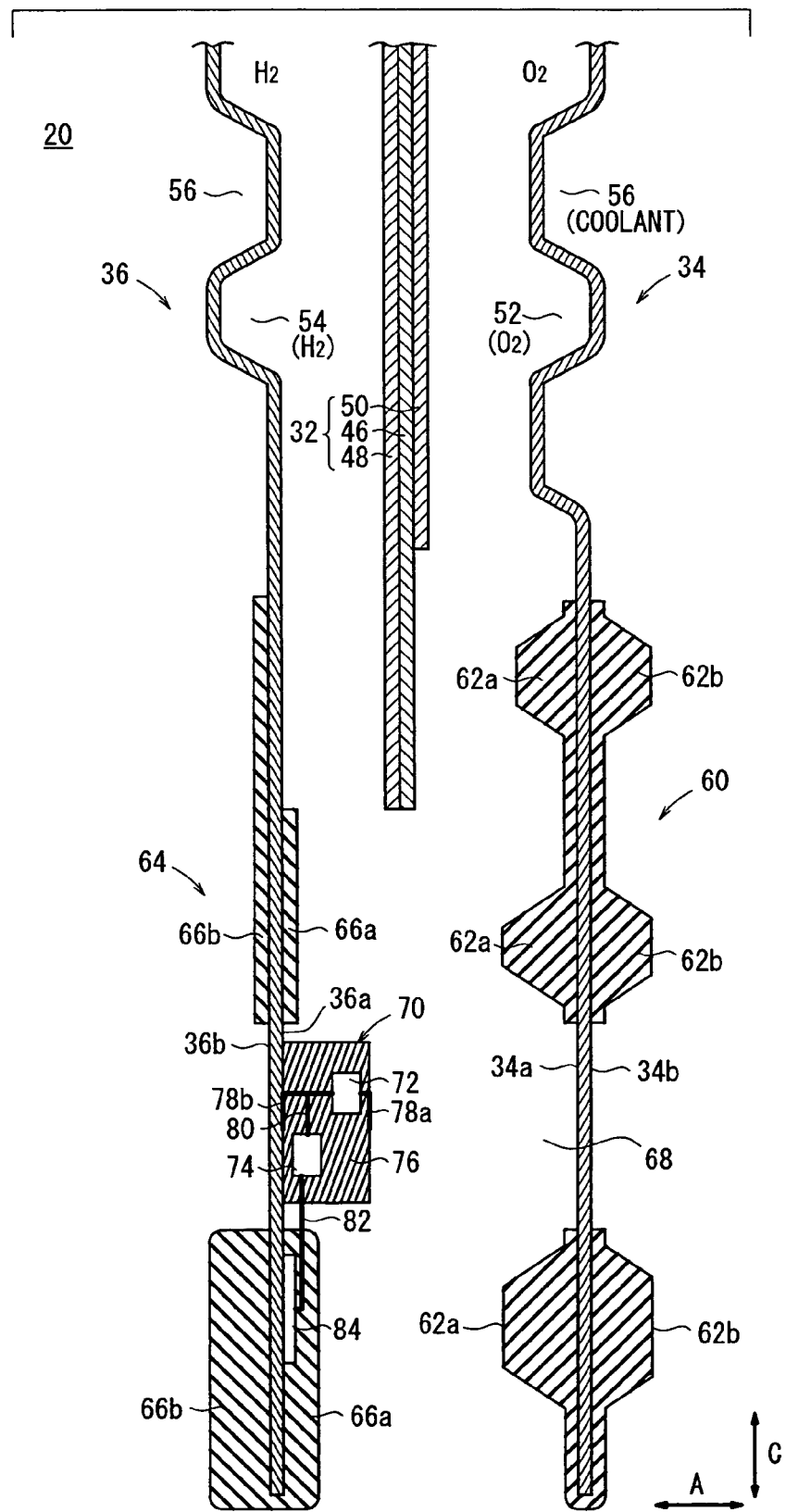
FIG. 3 is a cross sectional view showing the power generation cell.

As shown in FIGS. 2 and 3, each of the power generation cells 20 includes a membrane electrode assembly (electrolyte electrode assembly) 32 and first and second metal separators 34, 36 sandwiching the membrane electrode assembly 32. For example, the first and second metal separators 34, 36 are steel plates, stainless steel plates, aluminum plates, plated steel sheets, or metal plates having anti-corrosive surfaces by surface treatment.

At one end of the power generation cell 20 in a horizontal direction indicated by an arrow B in FIG. 2, an oxygen-containing gas supply passage 40a for supplying an oxygen-containing gas, a coolant discharge passage 42b for discharging a coolant, and a fuel gas discharge passage 44b for discharging a hydrogen-containing gas are arranged vertically in a direction indicated by an arrow C. The oxygen-containing gas supply passage 40a, the coolant discharge passage 42b, and the fuel gas discharge passage 44b extend through the power generation cell 20 in the direction indicated by the arrow A.

At the other end of the power generation cell 20 in the direction indicated by the arrow B, a fuel gas supply passage 44a, a coolant supply passage 42a, and an oxygen-containing gas discharge passage 40b are arranged vertically in the direction indicated by the arrow C. The fuel gas supply passage 44a, the coolant supply passage 42a, and the oxygen-containing gas discharge passage 40b extend through the power generation cell 20 in the direction indicated by the arrow A.

The membrane electrode assembly 32 includes an anode 48, a cathode 50, and a solid polymer electrolyte membrane 46 interposed between the anode 48 and the cathode 50. The solid polymer electrolyte membrane 46 is formed by impregnating a thin membrane of perfluorosulfonic acid with water, for example. The surface area of the anode 48 is larger than the surface area of the cathode 50.

Each of the anode 48 and the cathode 50 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the anode 48 and the electrode catalyst layer of the cathode 50 are fixed to both surfaces of the solid polymer electrolyte membrane 46, respectively.

As shown in FIG. 2, the first metal separator 34 has an oxygen-containing gas flow field 52 on its surface 34a facing the cathode 50. The oxygen-containing gas flow field 52 is connected between the oxygen-containing gas supply passage 40a and the oxygen-containing gas discharge passage 40b. For example, the oxygen-containing gas flow field 52 comprises straight grooves extending in the direction indicated by the arrow B. The second metal separator 36 has a fuel gas flow field 54 on its surface 36a facing the anode 48. The fuel gas flow field 54 is connected between the fuel gas supply passage 44a and the fuel gas discharge passage 44b. For example, the fuel gas flow field 54 comprises straight grooves extending in the direction indicated by the arrow B.

A coolant flow field 56 is formed between a surface 34b of the first metal separator 34 and a surface 36b of the second metal separator 36. The coolant flow field 56 is connected between the coolant supply passage 42a and the coolant discharge passage 42b. The coolant flow field 56 comprises straight grooves extending in the direction indicated by the arrow B.

A first seal member 60 is formed integrally on the surfaces 34a, 34b of the first metal separator 34, e.g., by heat treatment, to cover (sandwich) the outer edge of the first metal separator 34. The first seal member 60 is made of seal material, cushion material or packing material such as EPDM (Ethylene Propylene Diene Monomer), NBR (Nitrile Butadiene Rubber), fluoro rubber, silicone rubber, fluoro silicone rubber, butyl rubber (Isobutene-Isoprene Rubber), natural rubber, styrene rubber, chloroprene rubber, or acrylic rubber.

As shown in FIGS. 2 and 3, the first seal member 60 includes a plurality of first protrusions 62a formed integrally on the surface 34a of the first separator 34. The first protrusions 62a are provided at predetermined positions inside the outer edge of the first metal separator 34. The first protrusions 62a are provided around the oxygen-containing gas flow field 52. The first protrusions 62a are not provided between the oxygen-containing gas supply passage 40a and the oxygen-containing gas flow field 52, and between the oxygen-containing gas discharge passage 40b and the oxygen-containing gas flow field 52. Thus, the oxygen-containing gas flow field 52 is connected to the oxygen-containing gas supply passage 40a and the oxygen-containing gas discharge passage 40b.

Further, the first seal member 60 includes a plurality of second protrusions 62b formed integrally on the surface 34b of the first separator 34. The second protrusions 62b are provided at predetermined positions inside the outer edge of the first metal separator 34. The second protrusions 62b are provided around the coolant flow field 56. The second protrusions 62b are not provided between the coolant supply passage 42a and the coolant flow field 56, and between the coolant discharge passage 42b and the coolant flow field 56. Thus, the coolant flow field 56 is connected to the coolant supply passage 42a and the coolant discharge passage 42b on the surface 34b of the first metal separator 34.

Figure 4:
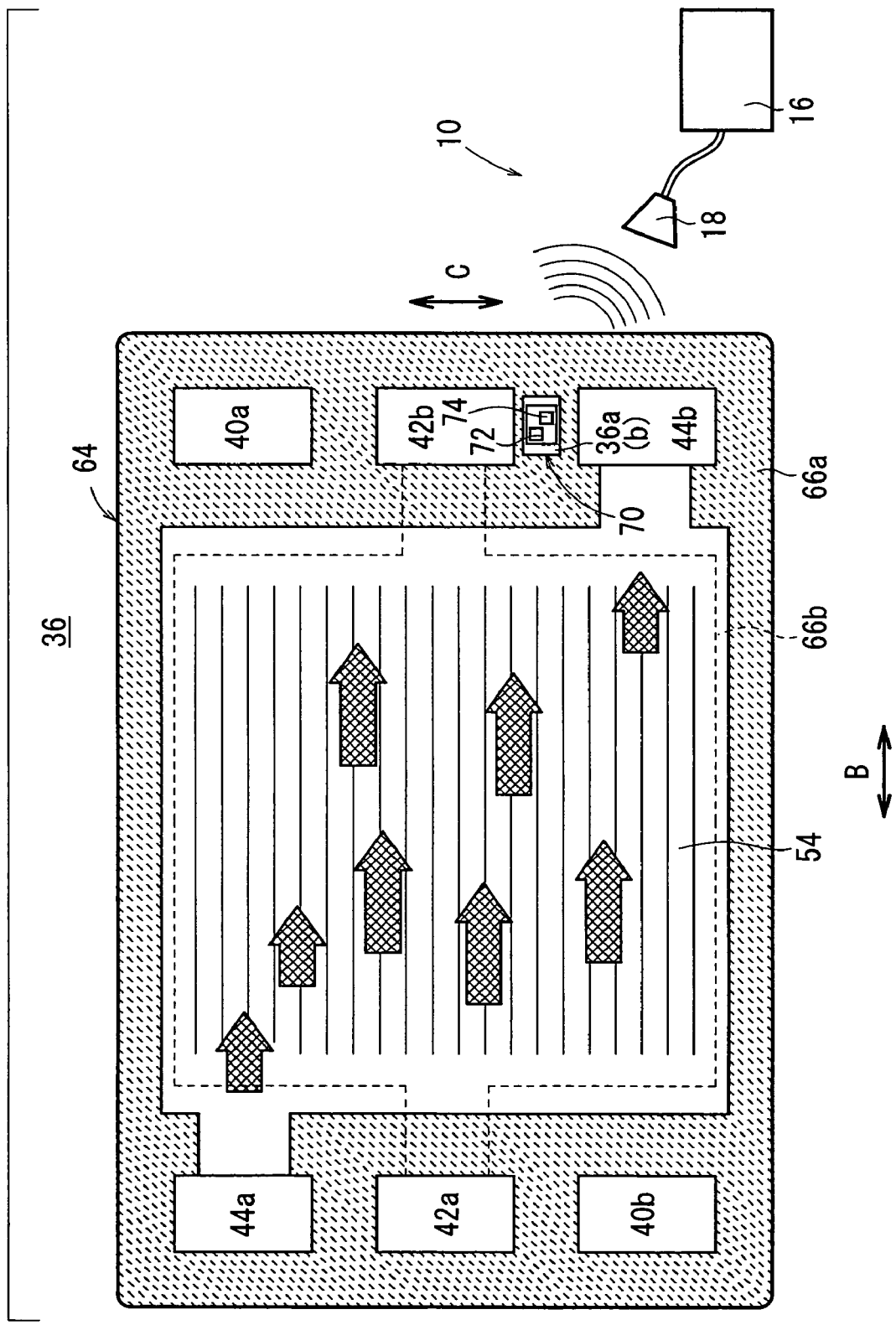
FIG. 4 is a front view showing a second metal separator of the fuel cell.
Figure 5:
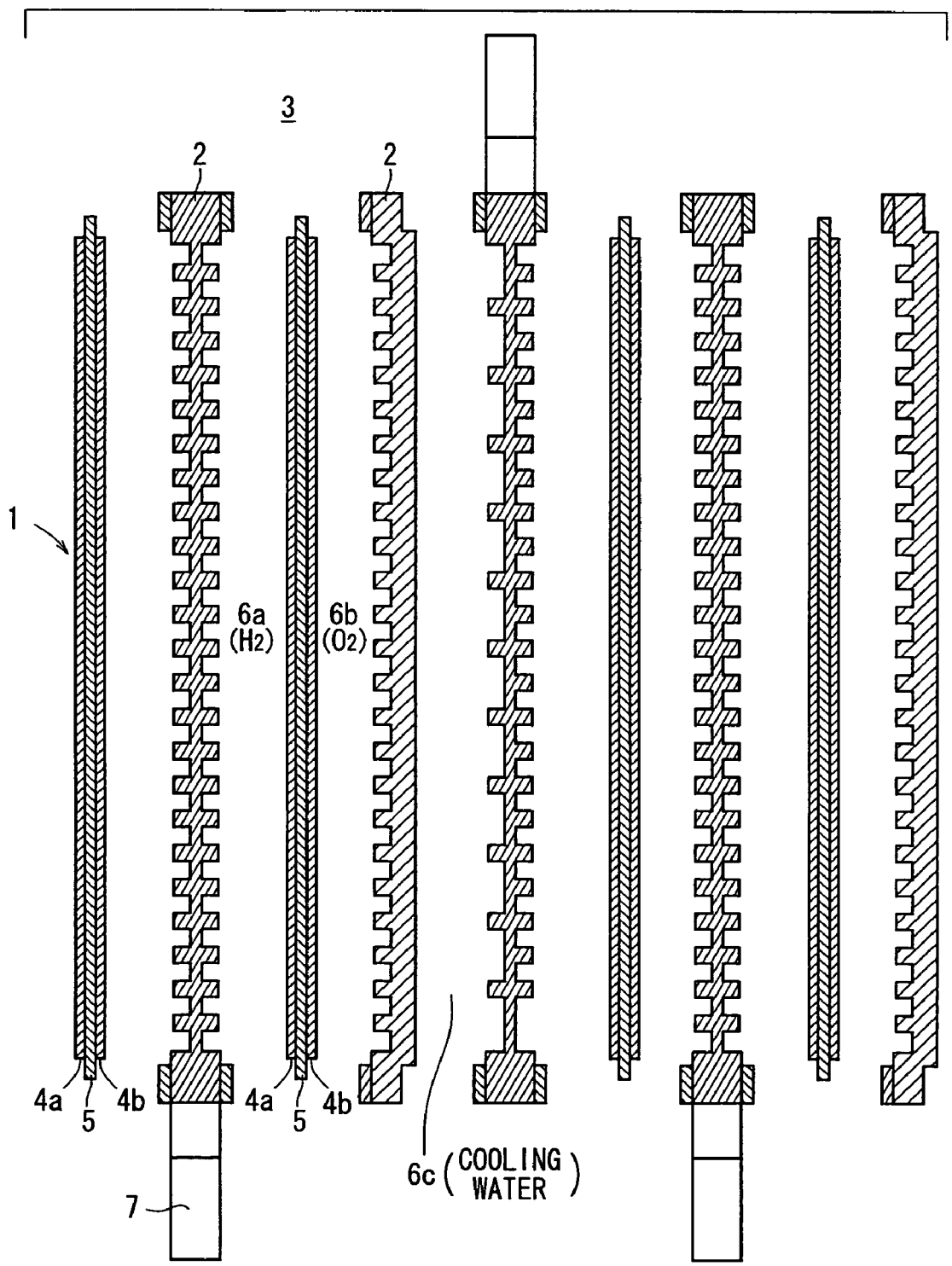
FIG. 5 is an exploded view showing a fuel cell disclosed in Japanese Laid-Open Patent Publication No. 11-339828.

As shown in FIGS. 2 through 4, a second seal member 64 is formed integrally on the surfaces 36a, 36b of the second metal separator 36 to cover (sandwich) the outer edge of the second metal separator 36. The material used for the second seal member 64 is same as the material used for the first seal member 60. A first flat portion 66a of the second seal member 64 is formed integrally on the surface 36a of the second metal separator 36 at a position near the outer edge of the second separator 36. A second flat portion 66b is provided integrally on the surface 36b of the second metal separator 36. The second flat portion 66b is longer (wider) than the first flat portion 66a.

As shown in FIG. 3, the first flat portion 66a tightly contacts first protrusions 62a of the first seal member 60, and the second flat portion 66b tightly contacts the second protrusions 62b of the first seal member 60. The first flat portion 66a contacts the outer edge of the electrolyte electrode assembly 32. The second flat portion 66b is overlapped with the anode 48 over a predetermined area.

As shown in FIGS. 2 and 4, the first flat portion 66a is provided around the fuel gas flow field 54, the fuel gas supply passage 44a, and the fuel gas discharge passage 44b. The first flat portion 66a is not provided between the fuel gas supply passage 44a and the fuel gas flow field 54, and between the fuel gas discharge passage 44b and the fuel gas flow field 54. Thus, the fuel gas flow field 54 is connected to the fuel gas supply passage 44a and the fuel gas discharge passage 44b. On the surface 36b of the second metal separator 36, the second flat portion 66b is not provided between the coolant supply passage 42a and the coolant flow field 56, and between the coolant discharge passage 42b and the coolant flow field 56. Thus, the coolant flow field 56 is connected to the coolant supply passage 42a and the coolant discharge passage 42b on the surface 36b of the second metal separator 36.

As shown in FIGS. 2 and 3, a portion of the surface 34a of the first metal separator 34 between the coolant discharge passage 42b and the fuel gas discharge passage 44b is exposed, and the exposed portion of the surface 34a defines part of a seal space 68. The seal space 68 is surrounded by the first protrusions 62a. As shown in FIGS. 2 through 4, when the first protrusions 62a of the first metal separator 34 contact the first flat portion 66a, a portion of the surface 36a of the second metal separator 36 between the coolant discharge passage 42b and the fuel gas discharge passage 44b is exposed, and defines part of the seal space 68. A device body 70 of the monitor device 10 is attached to the exposed portion of the surface 36a of the second metal separator 36.

As shown in FIG. 3, the device body 70 includes an internal information detection mechanism such as a voltage measurement sensor 72 for measuring the voltage generated in the power generation cell 20, and a transmission mechanism 74 for transmitting information of the voltage measured by the voltage measurement sensor 72 to the receiver antenna 18 via wireless communication. The voltage measurement sensor 72 and the transmission mechanism 74 are embedded in a magnetic/heat resistant shield member 76, and attached to the surface 36a of the second metal separator 36.

The voltage measurement sensor 72 includes a positive terminal 78a electrically connected to the surface 34a of the first metal separator 34 and a negative terminal 78b electrically connected to the surface 36a of the second metal separator 36. The voltage measurement sensor 72 is connected to the transmission mechanism 74 through a conductive wire 80, and the transmission mechanism 74 is connected to a power source unit 84 through a conductive wire 80.

Electrical energy generated during operation of the power generation cell 20 or electrical energy generated in a magnetic field is supplied to the transmission mechanism 74 and the voltage measurement sensor 72. The power source unit 84 is connected to the surface 36a of the second metal separator 36, and embedded in the first flat portion 66a.

The device body 70 is not necessarily provided for each of the power generation cells 20. The device body 70 is provided for a plurality of power generation cells 20, or provided only for the power generation cells 20 which particularly need the voltage measurement.

Next, operation of the fuel cell stack 14 and operation of the monitor device 10 will be described.

Firstly, as shown in FIG. 2, an oxygen-containing gas is supplied to the oxygen-containing gas supply passage 40a, and a fuel gas such as a hydrogen-containing gas is supplied to the fuel gas supply passage 44a. Further, a coolant such as pure water, an ethylene glycol, or an oil is supplied to the coolant supply passage 42a.

Thus, the oxygen-containing gas flows from the oxygen-containing gas supply passage 40a into the oxygen-containing gas flow field 52 of the first metal separator 34. The oxygen-containing gas flows along the cathode 50 of the membrane electrode assembly 32 in the direction indicated by the arrow B for inducing an electrochemical reaction at the cathode 50. Likewise, the fuel gas flows from the fuel gas supply passage 44a into the fuel gas flow field 54 of the second metal separator 36. The fuel gas flows along the anode 48 of the membrane electrode assembly 32 in the direction indicated by the arrow B for inducing an electrochemical reaction at the anode 48.

Thus, in the membrane electrode assembly 32, the oxygen-containing gas supplied to the cathode 50, and the fuel gas supplied to the anode 48 are consumed in the electrochemical reactions at catalyst layers of the cathode 50 and the anode 48 for generating electricity.

Then, after the oxygen-containing gas is consumed at the cathode 50, the oxygen-containing gas is discharged into the oxygen-containing gas discharge passage 40b, and flows in the direction indicated by the arrow A. Likewise, after the fuel gas is consumed at the anode 48, the fuel gas is discharged into the fuel gas discharge passage 44b, and flows in the direction indicated by the arrow A.

The coolant supplied to the coolant supply passage 42a flows into the coolant flow field 56 between the first and second metal separators 34, 36, and flows in the direction indicated by the arrow B. After the coolant cools the membrane electrode assembly 32, the coolant is discharged into the coolant discharge passage 42b.

In the embodiment of the present invention, as shown in FIG. 3, the seal space 68 is formed in each of the power generation cells 20, or in arbitrarily selected power generation cells 20, and the device body 70 of the monitor device 10 is provided in the seal space 68. The voltage measurement sensor 72 of the device body 70 is connected to the surface 34a of first metal separator 34 and the surface 36a of the second metal separator 36 through the terminals 78a, 78b, respectively. Thus, the voltage generated during operation of the power generation cell 20 is detected by the voltage measurement sensor 72. The information of the voltage detected by the voltage measurement sensor 72 is transmitted to the transmission mechanism 74 through the conductive wire 80, and transmitted from the transmission mechanism 74 to the receiver antenna 18 via wireless communication.

Since the receiver antenna 18 is connected to a controller 16, the voltage generated in the power generation cell 20 is inputted to the controller 16. Therefore, it is possible to constantly detect the voltage of the power generation cell 20 during the operation of the fuel cell stack 14 by the monitor device 10.

In the embodiment of the present invention, the voltage signal from the voltage measurement sensor 72 is transmitted from the transmission mechanism 74 to the receiver antenna 18 via wireless communication. Since the non-contact monitoring scheme using wireless communication is adopted, no components such as terminals or lead wires protruding toward the outside are required for the first and second separators 34, 36.

The first and second seal members 60, 64 simply seal the device body 70 between the first and the second metal separators 34, 36. Therefore, the sealing structure is very simple. Further, it is possible to easily and accurately detect the cell voltage of the power generation cell 20 in real time advantageously. Further, since the voltage measurement sensor 72 is provided in the power generation cell 20, voltage drop due to the contact resistance or the like is prevented, the cell voltage generated in the power generation cell 20 can be measured even further accurately.

Further, the device body 70 is disposed in the seal space 68 formed by the tight contact between the first protrusions 62a of the first metal separator 34 and the first flat portion 66a of the second metal separator 36. The seal space 68 is shielded from the outside. Therefore, no foreign material enters the seal space 68, and it is possible to advantageously prevent the voltage measurement sensor 72 or the transmission mechanism 74 from being degraded or damaged.

Further, if it is not likely that the voltage measurement sensor 72 or the transmission mechanism 74 is not degraded or damaged, only one of the voltage measurement sensor 72 and the transmission mechanism 74 may be provided in the seal space 68.

In the embodiment of the present invention, the voltage measurement sensor 72 is used as the internal information detection mechanism. However, the present invention is not limited in this respect. Various types of sensors for detecting various operating conditions such as the internal pressure, the internal humidity, or the internal temperature may be used depending on the application.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A monitor device for monitoring operating condition of a fuel cell, said fuel cell including an electrolyte electrode assembly and separators sandwiching said electrolyte electrode assembly, said electrolyte electrode assembly including a pair of electrodes and an electrolyte interposed between said electrodes, said monitor device comprising:

an internal information detection mechanism for detecting internal information of said fuel cell;

a transmission mechanism for transmitting said detected internal information via wireless communication; and a receiver mechanism provided outside said fuel cell for receiving said internal information transmitted via wireless communication, wherein said internal information detection mechanism and said transmission mechanism are provided inside seal members of said separators.

2. A monitor device according to claim 1, wherein a seal space surrounded by said seal members is formed between said separators such that entry of foreign material into said seal space is prevented; and at least one of said internal information detection mechanism and said transmission mechanism is disposed in said seal space.

3. A monitor device according to claim 2, wherein said separators comprise first and second metal separators sandwiching said electrolyte electrode assembly;

said seal member comprises first and second seal members provided on said first and second separators, respectively, and said first and second seal members tightly contact each other to form said seal space; and said first and second metal separators have first and second metal surface portions exposed to said seal space, respectively.

4. A monitor device according to claim 3, wherein said internal information detection mechanism is electrically connected to said first and second metal surface portions.

5. A monitor device according to claim 4, wherein said internal information detection mechanism and said transmission mechanism are embedded in an electromagnetic/heat resistant shield member, and attached to said first metal surface portion or said second metal surface portion.

6. A monitor device according to claim 1, wherein said transmission mechanism is connected to a power source unit, and said power source unit is embedded in said seal member.

7. A monitor device according to claim 1, wherein said internal information detection mechanism includes a voltage measurement sensor for measuring the cell voltage of said fuel cell.

* * * * *